(12) United States Patent
Goldman et al.

(10) Patent No.: US 8,520,522 B1
(45) Date of Patent: Aug. 27, 2013

(54) TRANSMIT-BUFFER MANAGEMENT FOR PRIORITY-BASED FLOW CONTROL

(75) Inventors: Gary Goldman, Los Altos, CA (US); Paul Kim, Fremont, CA (US); Chang-Hong Wu, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 278 days.

(21) Appl. No.: 12/905,696

(22) Filed: Oct. 15, 2010

(51) Int. Cl.
  *H04L 12/26* (2006.01)
(52) U.S. Cl.
  USPC .......................................................... 370/235
(58) Field of Classification Search
  USPC .................................... 370/229, 235, 230
  See application file for complete search history.

(56) References Cited

U.S. PATENT DOCUMENTS

| | | | | |
|---|---|---|---|---|
| 5,153,877 A * | 10/1992 | Esaki et al. | | 370/389 |
| 6,683,884 B1 * | 1/2004 | Howard | | 370/412 |
| 7,369,500 B1 * | 5/2008 | Gallagher et al. | | 370/235 |
| 2009/0122702 A1 * | 5/2009 | Chew et al. | | 370/235 |
| 2009/0196303 A1 * | 8/2009 | Battle et al. | | 370/403 |
| 2009/0323707 A1 * | 12/2009 | Aimoto | | 370/401 |
| 2010/0329250 A1 * | 12/2010 | Olesinski et al. | | 370/389 |

* cited by examiner

*Primary Examiner* — Andrew Lai
*Assistant Examiner* — Zhiren Qin
(74) *Attorney, Agent, or Firm* — Harrity & Harrity, LLP

(57) ABSTRACT

A network device operating in operating in a Priority Flow Control (PFC) mode receives a stream of packets for outputting on a particular port, assigns each packet in the stream of packets to one of multiple buffer queues associated with the port, and generates, based on the assigning, packet counts for the multiple buffer queues. The network device aggregates the packet counts for a group of particular buffer queues, of the multiple buffer queues, that are not subject to a PFC restriction, to create an unrestricted aggregated count. The network device determines whether the unrestricted aggregated count exceeds a flow-control threshold for the group of particular buffer queues and sends, to an upstream queue scheduler, a flow control signal when the unrestricted aggregated count exceeds a flow-control threshold.

20 Claims, 8 Drawing Sheets

TRANSMIT-BUFFER MANAGEMENT FOR PRIORITY-BASED FLOW CONTROL

BACKGROUND

In Internet Protocol (IP) packet-based networks, network devices (e.g., routers, switches, etc.) may handle the transmission of packets through the network. In some network devices, Priority-based Flow Control (PFC), as described in IEEE standard 802.1Qbb, may be implemented to eliminate packet loss during congestion in data center bridging networks. In PFC mode, certain network traffic may be paused, based on its priority, while other traffic is permitted to flow. When a pause command is received (e.g., from another network node), traffic (e.g., packets) for that node that is being processed by the forwarding network device may become ineligible for transmission. However, at the time the pause command is received, some packets may have already been selected, by an upstream scheduler, for transmission. These ineligible packets must be buffered downstream of the scheduler. Generally, buffer space downstream of the scheduler is a scarce resource, and the ineligible packets must be buffered in a manner that continues to allow eligible packets to pass.

SUMMARY

According to one aspect, a method may be performed by a network device operating in a Priority Flow Control (PFC) mode. The method may include receiving, by a processor of the network device, a stream of packets for outputting on a particular port; assigning, by the processor, each packet in the stream of packets to one of multiple buffer queues associated with the port; generating, by the processor and based on the assigning, packet counts for the multiple buffer queues; aggregating, by the processor and to create an unrestricted aggregated count, the packet counts for a group of particular buffer queues, of the multiple buffer queues, that are not subject to a PFC restriction; determining, by the processor, whether the unrestricted aggregated count exceeds a flow-control threshold for the group of particular buffer queues; and sending, by the processor and to an upstream queue scheduler, a flow control signal when the unrestricted aggregated count exceeds a flow-control threshold.

According to another aspect, a network device may include a memory having buffer space for multiple output queues and a processor. The processor may receive a stream of packets for outputting on a particular port; assign each packet in the stream of packets to one of the multiple output queues associated with the port; and generate packet counts for the multiple output queues based on the assignment of each packet in the stream of packets. The processor may also aggregate the packet counts for one or more groups of particular output queues, of the multiple output queues, to generate: an unrestricted aggregated count of output queues that are not subject to a PFC restriction, a first priority aggregated count of output queues that are associated with a first priority class, and a second priority aggregated count of output queues that are associated with a second priority class. The processor may determine that one or more of the unrestricted aggregated count, the first priority aggregated count, or the second priority aggregated count exceeds a respective flow-control threshold; and may send, to an upstream queue scheduler, one or more flow control signals when the respective flow control threshold is exceeded.

According to still another aspect, a method may include receiving, by a processor of a network device, a packet, from a packet stream, in a particular queue of a transmit buffer; applying, by the processor and based on receiving the packet, a count to the particular queue; applying, by the processor and based on receiving the packet, a count to an aggregated unrestricted bucket for queues that are not subject to a PFC restriction, where the aggregated unrestricted bucket is associated with multiple queues for the packet stream, including the particular queue; determining, by the processor, if a fill level of the aggregated unrestricted bucket exceeds a flow-control threshold for the aggregated unrestricted bucket; and sending, by the processor and to an upstream queue scheduler, a flow control signal based when the fill level of the aggregated unrestricted bucket exceeds the flow-control threshold.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Systems and/or methods described herein may implement buffer management mechanisms to enable Priority-based Flow Control (PFC) in a manner that prevents head-of-line blocking of output queues. The systems and/or methods may use a collection of resource tracking buckets to manage buffer space and may signal flow controls to traffic sources based on, for example, accumulation of packets due to a priority-pause (or flow restriction) signal (e.g., for a particular queue or stream). In one implementation, the buckets may be arranged in multiple shallow hierarchies to track traffic that is charged against particular queues, particular groups of queues, all queues in a particular stream, and/or an entire egress.

As described herein, an IEEE 802.3x PAUSE signal may be associated with a port. In contrast, an IEEE 802.1Qbb (PFC) PAUSE signal may be associated with an 802.1p priority. An 802.1p priority may be associated with a particular with queue within a network device. In implementations described herein, one queue may be assigned for each 802.1p priority, but arbitrary mappings between queues and 802.1p priorities are also possible. The term "stream," as used herein, may refer to a flow of packets to an interface, channel, or port. The term "port," as used herein, may refer to a physical interface. The term "packet," as used herein, may refer to a packet, a datagram, or a data item; a fragment of a packet, a fragment of a datagram, or a fragment of a data item; or another type, arrangement, or packaging of data.

Figure 1:
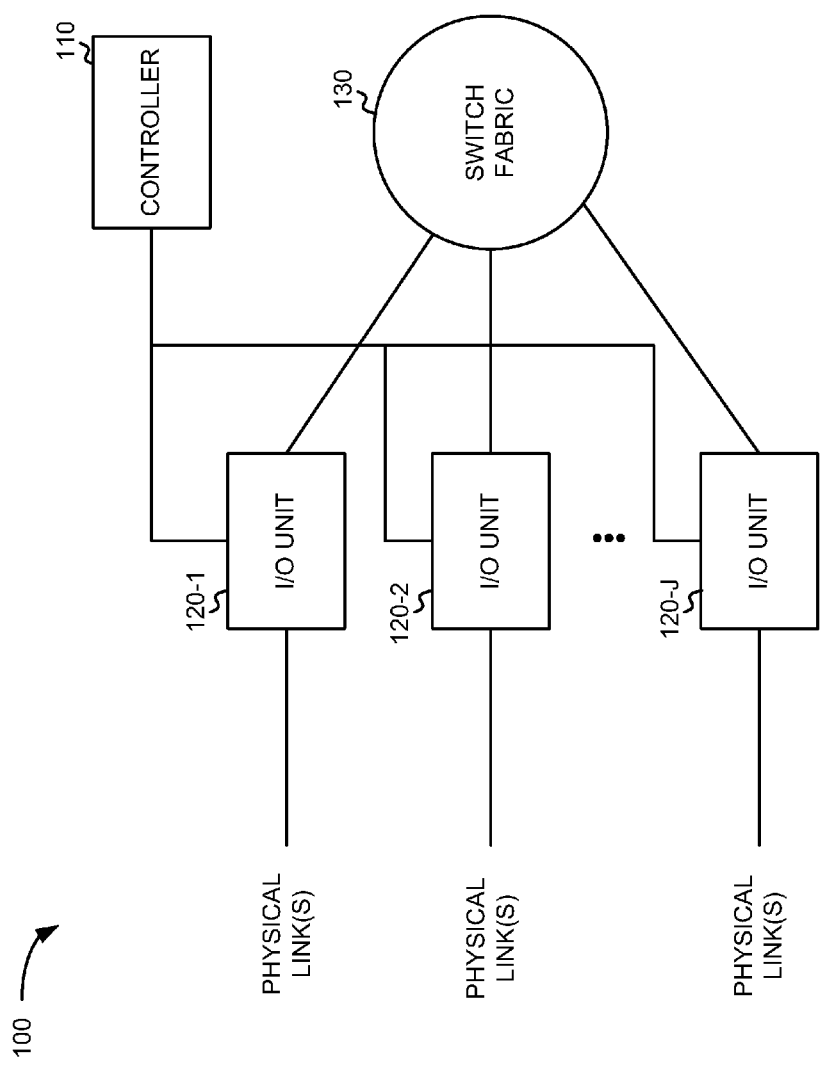
FIG. 1 is a diagram of an example network device in which systems and/or methods described herein may be implemented.

FIG. 1 is a diagram of an example network device 100 in which systems and/or methods described herein may be implemented. In this particular implementation, network device 100 may take the form of a router, although the systems and/or methods herein may be implemented in another type of network device. For example, network device 100 may include another data transfer device, such as a gateway, a switch, a firewall, a network interface card (NIC), a hub, a bridge, a proxy server, an optical add-drop multiplexer (OADM), or some other type of device that processes and/or transfers traffic.

Network device 100 may receive network traffic, as one or more packet stream(s), from physical links, may process the packet stream(s) to determine destination information, and may transmit the packet stream(s) out on links in accordance with the destination information. Network device 100 may include a controller 110, a set of input/output (I/O) units 120-1, 120-2, . . . , 120-J (where J>1) (hereinafter referred to collectively as "I/O units 120" and individually as "I/O unit 120"), and a switch fabric 130.

Controller 110 may include a processor, a microprocessor, or some form of hardware logic (e.g., an application specific integrated circuit (ASIC) or a field programmable gate array (FPGA)). In one example implementation controller 110 may include an Ethernet controller and/or another controller device. Controller 110 may perform high level management functions for network device 100. For example, controller 110 may maintain the connectivity and manage information/data necessary for transferring packets by network device 100. Controller 110 may create routing tables based on network topology information, create forwarding tables based on the routing tables, and communicate the forwarding tables to I/O units 120. I/O units 120 may use the forwarding tables to perform route lookup for incoming packets and perform the forwarding functions for network device 100. Controller 110 may also perform other general control and monitoring functions for network device 100.

I/O unit 120 may include a component or collection of components to receive packets, to process incoming and/or outgoing packets, and/or to transmit outgoing packets. For example, I/O unit 120 may include I/O ports, a packet forwarding engine (PFE), an Ethernet interface and/or another type of interface, a central processing unit (CPU), and/or a memory device. I/O unit 120 may include a collection of ports that receive or transmit packets via physical links. I/O unit 120 may include packet processing component(s), switch interface component(s), Internet processor component(s), memory device(s), etc.

Each of I/O units 120 may be connected to controller 110 and switch fabric 130. I/O units 120 may receive packet data on physical links connected to a network, such as a wide area network (WAN) or a local area network (LAN). Each physical link could be one of many types of transport media, such as an optical fiber or an Ethernet cable.

I/O units 120 may process incoming packet data prior to transmitting the data to another I/O unit 120 or the network. I/O units 120 may perform route lookups for the data using the forwarding table from controller 110 to determine destination information. If the destination indicates that the data should be sent out on a physical link connected to I/O unit 120, then I/O unit 120 may prepare the data for transmission by, for example, adding any necessary headers, modifying existing headers, and/or transmitting the data from the port associated with the physical link. If the destination indicates that the data should be sent to another I/O unit 120 via switch fabric 130, then I/O unit 120 may, if necessary, prepare the data for transmission to the other I/O unit 120 and/or may send the data to the other I/O unit 120 via switch fabric 130.

Switch fabric 130 may include one or multiple switching planes to facilitate communication among I/O units 120 and/or controller 110. In one implementation, each of the switching planes may include a single-stage switch or a multi-stage switch of crossbar elements. Switch fabric 130 may also, or alternatively, include processors, memories, and/or paths that permit communication among I/O units 120 and/or controller 110.

Although, FIG. 1 illustrates example components of network device 100, in other implementations, network device 100 may include additional components, fewer components, different components, or differently arranged components than those illustrated in FIG. 1 and described herein. Additionally, or alternatively, one or more operations described as being performed by a particular component of network device 100 may be performed by one or more other components, in addition to or instead of the particular component of network device 100.

Figure 2:
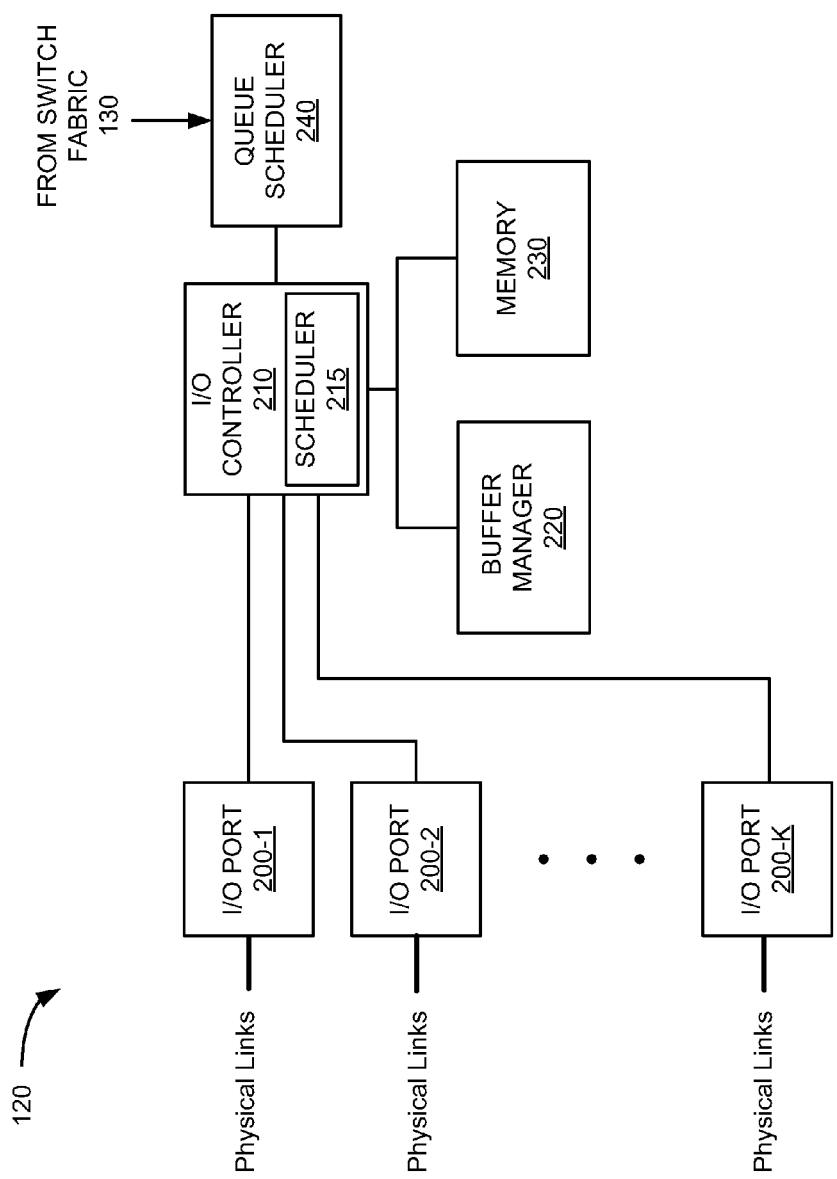
FIG. 2 is a detailed block diagram illustrating an example portion of the network device shown in FIG. 1.

FIG. 2 is a block diagram illustrating example components of I/O unit 120. As illustrated in FIG. 2, I/O unit 120 may include a set of input/output ports 200-1, 200-2, . . . , 200-K (where K≧1) (referred to herein collectively as "I/O ports 200" and individually as "I/O port 200"), an input/output (I/O) controller 210 that includes a scheduler 215, a buffer manager 220, a memory 230, and a queue scheduler 240.

I/O ports 200 may be a point of attachment for a physical link and/or may include a component to receive, transmit, and/or process packets on a network link or links. For example, I/O ports 200 may include an Ethernet interface, an optical cable interface, an asynchronous transfer mode (ATM) interface, or another type of interface. I/O ports 200 may include a variety of physical interfaces via which packets can be received, can be transmitted, or can be received and transmitted. I/O ports 200 may transmit data between a physical link and I/O controller 210. In one implementation, each of I/O ports 200 may be a physical interface card (PIC). Different I/O ports 200 may be designed to handle different types of network links. For example, one of I/O ports 200 may be an interface for an optical link while another of I/O port 200 may be an interface for an Ethernet link, implementing any of a number of well-known protocols.

For outgoing data, in one implementation, I/O ports 200 may receive packets from I/O controller 210, encapsulate the packets in L1 protocol information, and transmit the data on the physical link or "wire." For incoming data, I/O ports 200 may remove layer 1 (L1) protocol information and forward the remaining data, such as raw packets, to I/O controller 210.

I/O controller 210 may include a processor, a microprocessor, or some form of hardware logic (e.g., an ASIC or a FPGA). In one example implementation, controller 210 may include an Ethernet controller and/or another controller device. I/O controller 210 may perform packet forwarding functions and handle packet transfers to and/or from I/O ports 200 and switch fabric 130. For example, I/O controller 210 may perform routing lookups, classification of packets (e.g., for security purposes), policy-based routing, quality of service (QoS) routing, filtering of packets, and other forms of packet processing (e.g., packet statistical processing, accounting, and/or encapsulation). I/O controller 210 may send requests for memory resources to buffer manager 220 that enables I/O controller 210 to retrieve and/or temporarily store packet information in memory 230.

Scheduler 215 may manage traffic flows for outgoing packets processed by I/O controller 210.

Buffer manager 220 may include a processor, a microprocessor, or some form of hardware logic (e.g., an ASIC or a FPGA) and/or a component or collection of components to manage memory resources for I/O controller 210. For example, buffer manager 220 may receive a request for memory resources from I/O controller 210. Buffer manager 220 may receive the request and may identify a storage location, within memory 230, at which packet information may be temporarily stored. Buffer manager 220 may manage resources associated with memory 230 by performing searches to identify unallocated entries (e.g., available storage space) within memory 230 within which to store packet information. Buffer manager 220 may send, to I/O controller 210, address information associated with the location of the available storage space. In another example, buffer manager 220 may update allocation information and/or de-allocation information, associated with memory 230, when I/O controller 210 stores new packet information in memory 230 and/or reads packet information from memory 230.

Memory 230 may include a component or set of components that are capable of writing, storing, and/or reading information. Memory 230 may include a memory device or group of memory devices, a processor, a microprocessor, or some form of hardware logic (e.g., an ASIC or a FPGA). For example, memory 230 could be a reduced latency dynamic random access memory (RLDRAM) that may include a memory component (e.g., an integrated circuit configured to read, to write, and/or to store data blocks). In another example, memory 230 could be a dynamic random access memory (DRAM) and/or some other form of random access memory (RAM) that may include a memory component configured to read, to write, and/or to store packet information (e.g., fixed and/or variable length packets, header information, etc.).

Memory 230 may communicate with I/O controller 210 and/or buffer manager 220 to write, to store, and/or to read packet information. For example, memory 230 may receive packet information and may write the packet information into an available memory location (e.g., an unallocated entry). Memory 230 may respond to read requests from I/O controller 210 and/or buffer manager 220 and may retrieve and/or forward packet information I/O controller 210 and/or buffer manager 220.

Queue scheduler 240 may include a processor, a microprocessor, or some form of hardware logic (e.g., an ASIC or a FPGA) and/or a component or collection of components to control the dequeuing of packets from buffer queues (e.g., received via from switch fabric 130). In order to control a high packet throughput, network device 100 may use memory buffers to temporarily queue packets waiting to be processed based upon predefined criteria, such as relative weight or priority. In one implementation, queue scheduler 240 may be included on a separate chip from I/O controller 210, buffer manager 220, and memory 230. Packets from queue scheduler 240 may be directed to I/O controller 210 for processing.

Although, FIG. 2 illustrates example components of I/O unit 120, in other implementations, I/O unit 120 may include additional components, fewer components, different components, or differently arranged components than those illustrated in FIG. 2 and described herein. Additionally, or alternatively, one or more operations described as being performed by a particular component of I/O unit 120 may be performed by one or more other components, in addition to or instead of the particular component of I/O unit 120.

Figure 3:
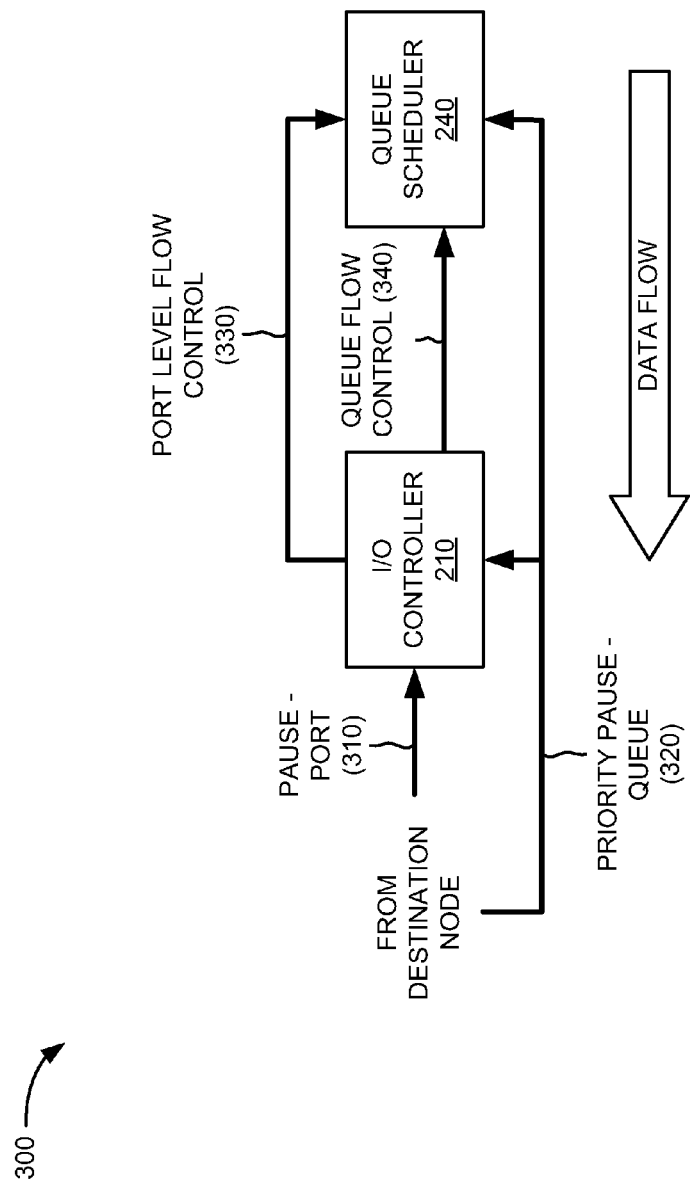
FIG. 3 is a detailed block diagram showing example components of a portion of the network device shown in FIG. 1.

FIG. 3 is a block diagram showing communications within a portion 300 of network device 100 according to an implementation described herein. More particularly, communications within portion 300 may include control signals to manage outgoing traffic in PFC mode. Portion 300 may represent a portion of an egress I/O unit (e.g., I/O unit 120) and may include I/O controller 210 and queue scheduler 240. I/O controller 210 and queue scheduler 240 may include features described above in connection with, for example, FIG. 2.

As shown in FIG. 3, a data flow of outgoing packets on an egress path may generally flow from queue scheduler 240 to I/O controller 210. In accord with PFC protocols, I/O controller 210 may receive, from a destination node, a per-port pause signal 310 or a per-priority pause signal 320. In one implementation, per-priority pause signal 320 may also be sent to queue scheduler 240. Generally, per-port pause signal 310 and/or per-priority pause signal 320 may identify congestion points of the data flow. Per-port pause signal 310 may indicate a particular port (e.g., I/O port 200-1 of FIG. 2) for which traffic is ineligible for transmission. Per-priority pause signal 320 may indicate a particular queue or queues (e.g., within I/O controller 210) for which traffic is ineligible for transmission.

In response to per-port pause signal 310, I/O controller 210 may stop transmission of all packets associated with the particular port (e.g., I/O port 200-1). Due to per-port pause signal 310, the ineligible packets previously scheduled for the particular port will cause congestion in a buffer associated with the port. As described further herein, this congestion may be measured by the aggregate occupancies (e.g., the number of packets or cells) of output queues associated with the particular port. The congestion in the buffer may eventually cause I/O controller 210 to issue a port level flow control signal 330 to queue scheduler 240. Port level flow control signal 330 may inhibit queue scheduler 240 from selecting packets from ineligible streams.

In response to per-priority pause signal 320, I/O controller 210 may stop transmission of all packets associated with a particular queue. Similarly, if per-priority pause signal 320 is received at queue scheduler 240, queue scheduler 240 may stop forwarding (e.g., to I/O controller 210) all packets associated with a particular queue. In some instances, multiple per-priority pause signals 320 may be received for multiple queues associated with the same port (e.g., I/O port 200-1). Due to per-priority pause signal 320, the ineligible packets previously scheduled for the particular queue will cause congestion in a buffer associated with the queue. This congestion may be measured, for example, by the number of packets occupying the particular output queue associated with I/O controller 210 and/or by the aggregate occupancies of a group of queues associated with the same port. The congestion in the buffer may eventually cause I/O controller 210 to issue a queue group flow control signal 340 to queue scheduler 240. Queue group flow control signal 340 may inhibit queue scheduler 240 from selecting packets from ineligible queues.

Generally, port level flow control signal 330 and/or queue group flow control signal 340 may result in removal of the congestion points from future scheduling decisions by queue scheduler 240.

Although, FIG. 3 illustrates example components of device portion 300, in other implementations, device portion 300 may include additional components, fewer components, different components, or differently arranged components than those illustrated in FIG. 3 and described herein. Additionally, or alternatively, one or more operations described as being performed by a particular component of device portion 300 may be performed by one or more other components, in addition to or instead of the particular component of device portion 300.

Figure 4:
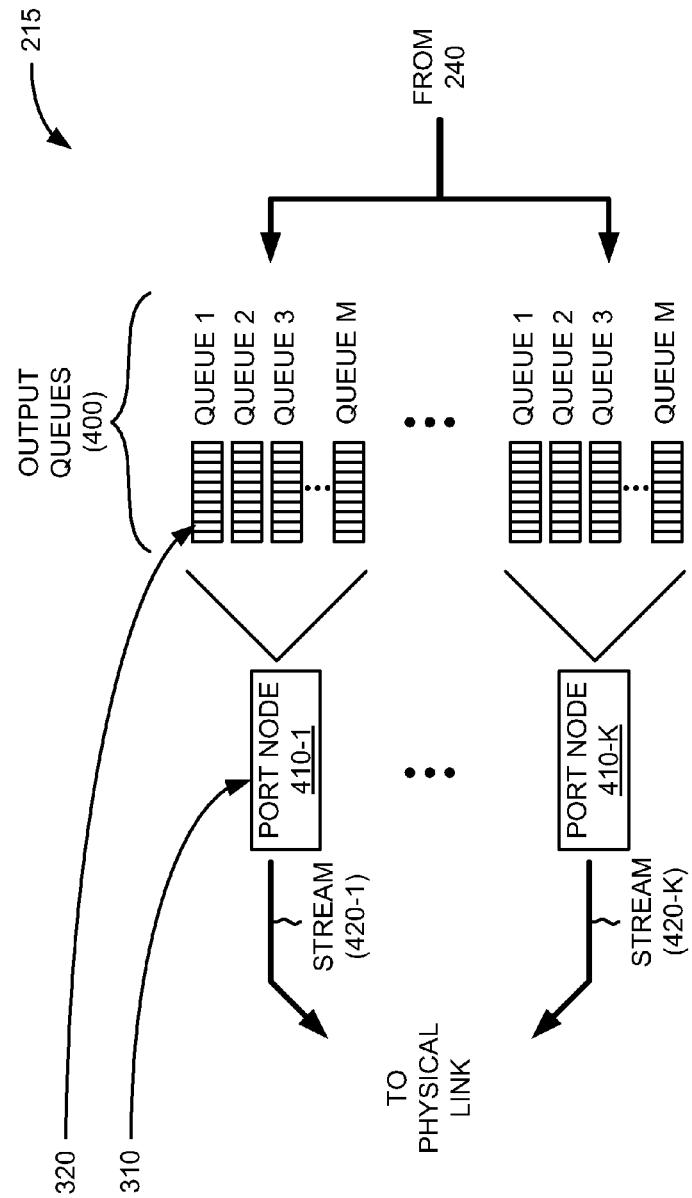
FIG. 4 is a block diagram of example components of a scheduler of an I/O controller of FIG. 2.

FIG. 4 is a block diagram of example components of scheduler 215 of I/O controller 210 according to an implementation described herein. Scheduler 215 may manage traffic flows for outgoing packets processed by I/O controller 210.

As shown in FIG. 4, scheduler 215 may assign packets, received from a packet processor, to multiple output queues 400. Each output queue 400 may be associated with a particular port node 410-1, . . . , 410-K (referred to herein collectively as "port nodes 410" and individually as "port node 410"). In one implementation, multiple output queues 400 may be grouped with a particular port node 410 to form a queue group. For example, each port node 410 may be associated with a group of eight output queues 400. Traffic (e.g., packets from output queues 400) associated with a particular port node 410 may be referred to as a packet stream (e.g., packet streams 420-1, . . . , 420-K).

In the example of FIG. 4, assume per-port pause signal 310 is applied to port-node 410-1 of scheduler 215. Application of per-port pause signal 310 to port-node 410-1 may essentially block scheduler 215 from scheduling packets assigned to port-node 410-1 (e.g., stream 420-1). Packets from the packet processor (e.g., packets scheduled by queue scheduler 240 before receiving per-port pause signal 310) may still be fed into output queues 400 (e.g., queue 1, queue 2, queue 3 . . . , queue M) associated with port node 410-1 and buffered accordingly.

Still referring to FIG. 4, assume per-priority pause signal 320 is applied to "queue 1" associated with port node 410-1. Also assume a copy of per-priority pause signal 320 is forwarded to queue scheduler 240. Application of per-priority pause signal 320 to "queue 1" may essentially block scheduler 215 from scheduling packets assigned to "queue 1" associated with port-node 410-1. Packets from the packet processor (e.g., packets scheduled by queue scheduler 240 before receiving per-priority pause signal 320) may still be fed into "queue 1" associated with port node 410-1 and buffered accordingly.

Buffer resources may be shared within a queue group (e.g., queue 1, queue 2, queue 3 . . . , queue M associated with port node 410-1) via statistical multiplexing. Each output queue 400 may be configured with a flow-control buffer threshold, where the sum of the threshold allotments can oversubscribe the total for the queue-group. Output queues 400 may generate flow control based on the combined occupancy (e.g., number of packets) for the queue group. When the combined occupancy exceeds a threshold, all queues in the particular queue group may be flow controlled (e.g., inhibited) at upstream queue scheduler 240.

Although, FIG. 4 illustrates example components of scheduler 215, in other implementations, scheduler 215 may include additional components, fewer components, different components, or differently arranged components than those illustrated in FIG. 4 and described herein. Additionally, or alternatively, one or more operations described as being performed by a particular component of scheduler 215 may be performed by one or more other components, in addition to or instead of the particular component of scheduler 215.

Figure 5:
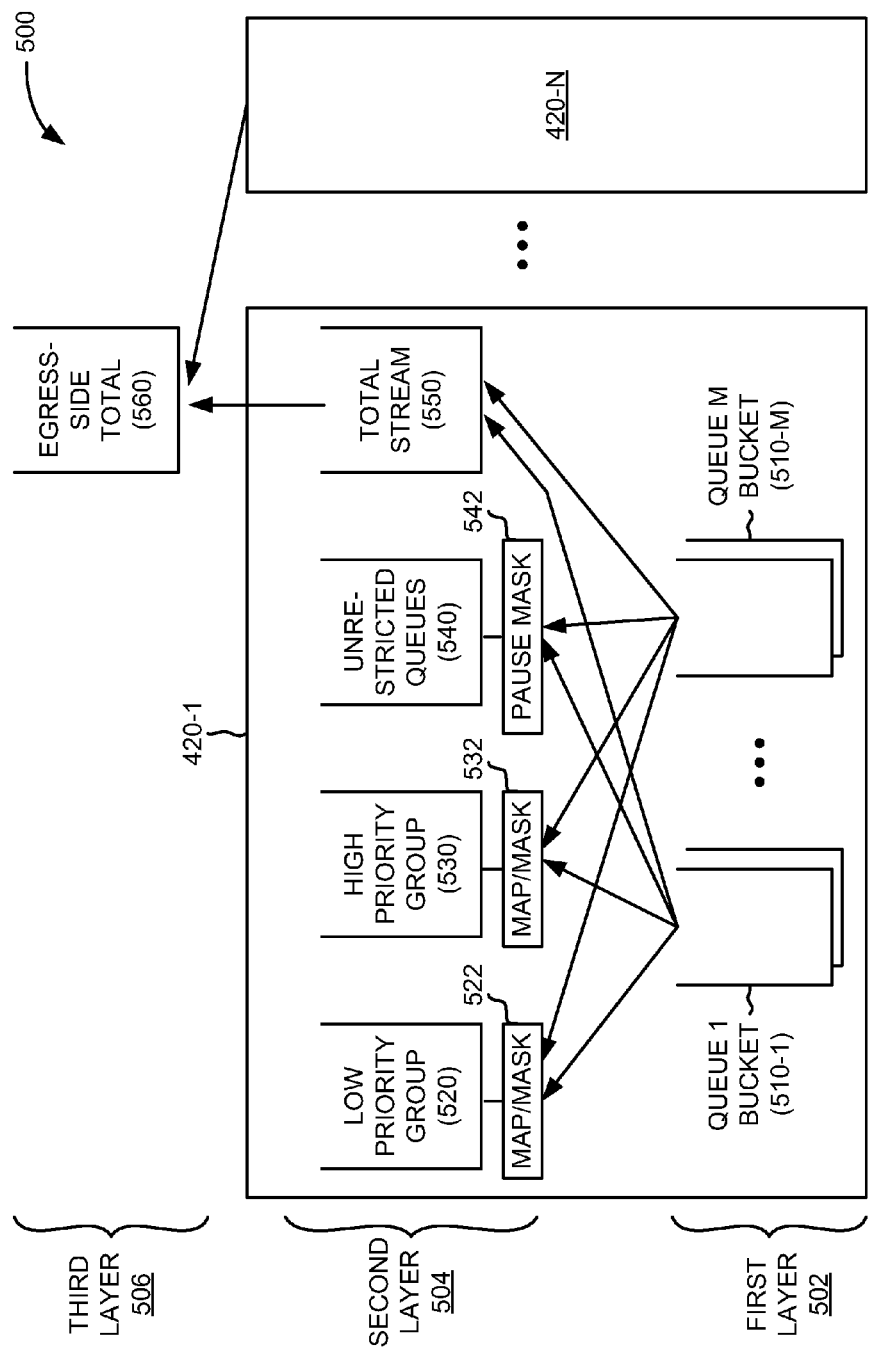
FIG. 5 is an illustration of an example bucket hierarchy for a buffer manager of FIG. 2.

FIG. 5 provides an illustration of an example bucket hierarchy 500 for scheduler 215. Buckets in FIG. 5 may be used to measure buffer usage so as to indicate flow controls to queue scheduler 240 in case of congestion. As shown in FIG. 5, bucket hierarchy 500 may include a first layer 502, a second layer 504, and a third layer 506.

First layer 502 may include queue buckets 510-1 through 510-M (referred to herein collectively as "queue buckets 510" and individually as "queue bucket 510") that correspond to each output queue 400 (e.g., queue 1, queue 2, queue 3 . . . , queue M) of a stream (e.g., stream 420-1). Each of queue buckets 510-1 through 510-M may include a counter for packets, such that each packet in the stream is charged to a particular output queue 400. Counts from each of queue buckets 510-1 through 510-M may be passed along to aggregate buckets in second layer 504.

Second layer 504 may include a set of aggregate buckets: a low priority group bucket 520, a high priority group bucket 530, an unrestricted queues bucket 540, and a total stream bucket 550. While four aggregate buckets are shown in FIG. 5, in other implementations, more or fewer aggregate buckets may be used. For example, in another implementation low priority group bucket 520 and high priority group bucket 530 may be split into different groups (e.g., low, medium, high priority). As shown in FIG. 5, the four aggregate buckets of second layer 504 may aggregate counts from output queues 400 of the stream (e.g., stream 420-1). Each of low priority group bucket 520, high priority group bucket 530, unrestricted queues bucket 540, and total stream bucket 550 may include packet counters and flow control thresholds. Flow control thresholds are described further below in connection with, for example, FIG. 6.

Low priority group bucket 520 and high priority group bucket 530 may be configurable "class group" buckets for stream 420-1. For example, low priority group bucket 520 may represent an aggregation of queues within stream 420-1; while high priority group bucket 530 may represent an aggregation of different (or overlapping) queues within stream 420-1. A mapping function (e.g., map/mask 522 and map/mask 532) may associate each of buckets 510-1 through 510-M with one, both, or none of low priority group bucket 520 and high priority group bucket 530. Each of low priority group bucket 520 and high priority group bucket 530 may have a unique flow-control threshold.

Unrestricted queues bucket 540 may count the total occupancies for each of buckets 510-1 through 510-M which are not subject to a per-priority pause for stream 420-1. A mapping function (e.g., pause mask 542) may associate un-paused buckets 510-1 through 510-M with unrestricted queues bucket 540. Unrestricted queues bucket 540 may have a configurable flow-control threshold. The occupancy of bucket 540 may be considered the "transmittable" buffer occupancy. For PFC, where individual output queues 400 may receive priority-pause indications, unrestricted queues bucket 540 may aggregate the occupancies for each of buckets 510-1 through 510-M which are enabled to transmit to port 420-1.

Total stream bucket 550 may count the total occupancies for the entire stream 420-1 (e.g., the sum for all of buckets 510-1 through 510-M in first layer 502). Total stream bucket 550 may include configurable flow-control thresholds that may be used to limit the total buffer usage for stream 420-1. For example, when a fill level in total stream bucket 550 exceeds a flow-control threshold, a flow control signal may be sent to queue scheduler 240 for the respective stream. Use of total stream bucket 550 may allow the sum of occupancies in low priority group bucket 520 and high priority group bucket 530 to oversubscribe the allotted buffer space for stream 420-1.

A similar bucket hierarchy of first layer 502 and second layer 504 may be applied to each stream 420 processed by I/O controller 210. Thus, flow controls may be applied for class groups, un-paused queue groups, and cumulative totals of each egress stream 420.

Third layer 506 may include an egress-side total bucket 560 that accumulates the total buffer utilization for all egress streams (e.g., streams 420-1, . . . , 420-N) in I/O unit 120. Egress-side total bucket 560 may include configurable flow control thresholds. Egress-side total bucket 560 may, thus, provide a fail-safe flow control in case of oversubscription on all egress streams 420. That is, egress-side total bucket 560 may enable buffer space sharing among different egress streams 420.

Although, FIG. 5 illustrates an example structure of bucket hierarchy 500, in other implementations, bucket hierarchy 500 may include additional components, fewer components, different components, or differently arranged components than those illustrated in FIG. 5 and described herein. Additionally, or alternatively, one or more operations described as being performed by a particular component of bucket hierarchy 500 may be performed by one or more other components, in addition to or instead of the particular component of bucket hierarchy 500.

Figure 6:
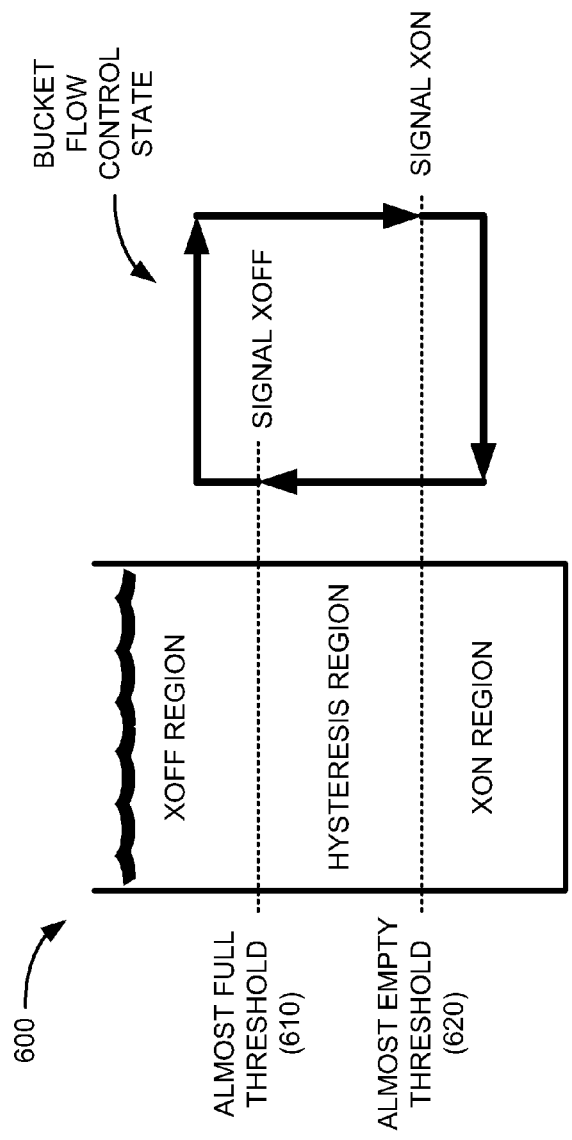
FIG. 6 is a diagram of example threshold operations for an example bucket of FIG. 5.

FIG. 6 provides a diagram of example threshold operations for an example bucket 600. Bucket 600 may correspond, for example, to low priority group bucket 520, high priority group bucket 530, unrestricted queues bucket 540, total stream bucket 550, and/or egress-side total bucket 560.

Bucket 600 may include a one or more counters and two flow-control thresholds (e.g., almost full threshold 610 and almost empty threshold 620). In one implementation bucket 600 may include separate counters and flow-control thresholds for buffer cells and packets, basing flow-control decisions on either of these flow-control thresholds. As shown in FIG. 6, almost full threshold 610 and almost empty threshold 620 may divide a fill-level of bucket 600 into three regions, namely an XOFF (e.g., almost full) region, a hysteresis region, and an XON (e.g., almost empty) region.

In case of congestion, as the fill-level of bucket 600 exceeds almost full threshold 610, I/O controller 210 may assert flow controls against the output queue(s) mapped to that bucket. When the fill-level drops below a particular queue's almost empty threshold 620, I/O controller 210 may similarly release the flow controls for the output queue(s) mapped to that bucket.

Each enqueue or dequeue event may cause updates to the appropriate bucket counters, causing I/O controller 210 to check the current region for that bucket and threshold combination. The results of all the bucket checks (e.g., including per-queue and per-queue-group, for cells and packet resources) may be combined to determine an aggregate flow-control state for I/O controller 210.

When aggregating flow-control for multiple buckets (e.g., queue buckets 510, low priority group bucket 520, high priority group bucket 530, unrestricted queues bucket 540, total stream bucket 550, and/or egress-side total bucket 560) in a hierarchy (e.g., hierarchy 500), a combination flow control algorithm based on bucket 600 may be generally described as follows. If any bucket 600 indicates XOFF (almost full state) then the aggregate flow control is set to XOFF, else XON. For example, XOFF may be indicated for a particular output queue 400 due to an almost full state in any of (1) bucket 510-1 corresponding to that output queue, (2) a class group bucket (e.g., low priority group bucket 520 or high priority group bucket 530) associated with bucket 510-1, (3) unrestricted queues bucket 540, or (4) total stream bucket 550.

In one implementation, almost full threshold 610 for unrestricted queues bucket 540 may be set lower than the almost full thresholds 610 for the other buckets in second layer 504 (e.g., lower than the almost full threshold 610 for low priority group bucket 520, high priority group bucket 530, and total stream bucket 550). In normal operation, and without any priority-pause (e.g., per-priority pause 320) received at a port 200 (e.g., associated with one of port nodes 410), the almost full threshold 610 for unrestricted queues buck 540 may cause queue scheduler 240 to adapt the stream to the rate of bandwidth available on the port. That is, if queue scheduler 240 is sending packets too fast for the port, the unrestricted queues bucket 540 occupancy may reach the almost full threshold, suppressing additional packets from being scheduled for this stream. Once the unrestricted queues bucket 540 occupancy falls below an almost empty threshold (e.g., almost empty threshold 620), the flow control may be removed, instructing queue scheduler 240 to resume scheduling traffic for the stream. In this regime, queue scheduler 240 may select from among the queues for a stream based on its scheduling policy and the bandwidth available for the stream, and this policy is not influenced or perturbed by per-queue flow controls from IO controller 210.

As shown in FIG. 3 above, if priority-pause 320 is received for one or more queues 400 on a port node 410, a copy of priority-pause 320 may be sent to queue scheduler 240, to make one or more queues of queue scheduler 240 ineligible for scheduling. Unrestricted queues bucket 540 may adjust to determine the number of packets (or amount of traffic) in the transmit buffer for queues which are still eligible to be transmitted, thereby causing queue scheduler 240 to again adapt to the rate of bandwidth available on the port, constrained to those queues which are not restricted.

In some cases, the occupancy of unrestricted queues bucket 540 may be low (e.g., below almost empty threshold 620), yet the total occupancy of ineligible queues may be high, and may start to approach the total buffer space provided for the stream. In this instance, the almost full threshold 610 for low priority group bucket 520 and/or high priority group bucket 530 may be crossed, inhibiting queue scheduler 240 from scheduling additional packets for queues in an almost-full queue group(s), while still allowing scheduling for queues which are not mapped to any almost-full queue group(s).

Figure 7:
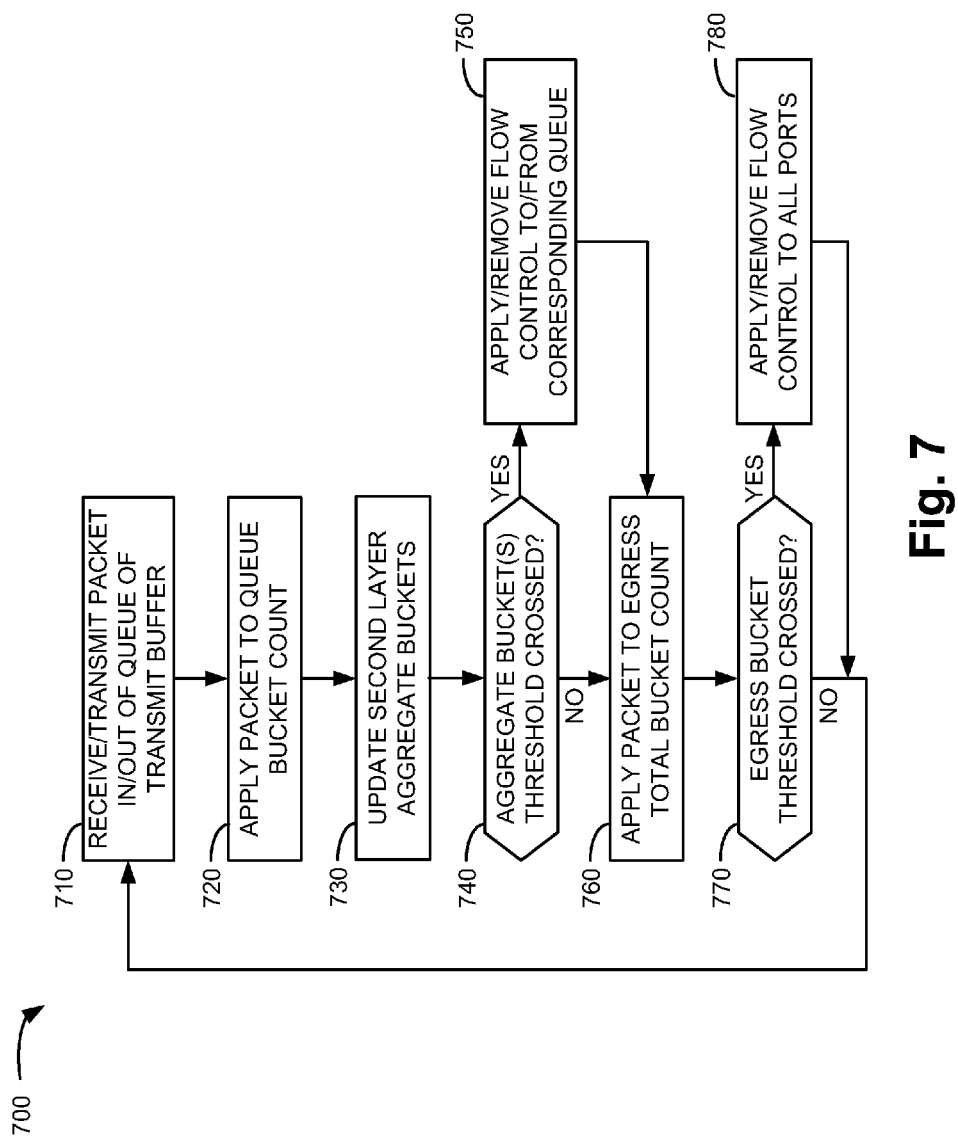
FIGS. 7 and 8 are flow charts of an example process for managing transmit buffer resources according to an implementation described herein.
Figure 8:
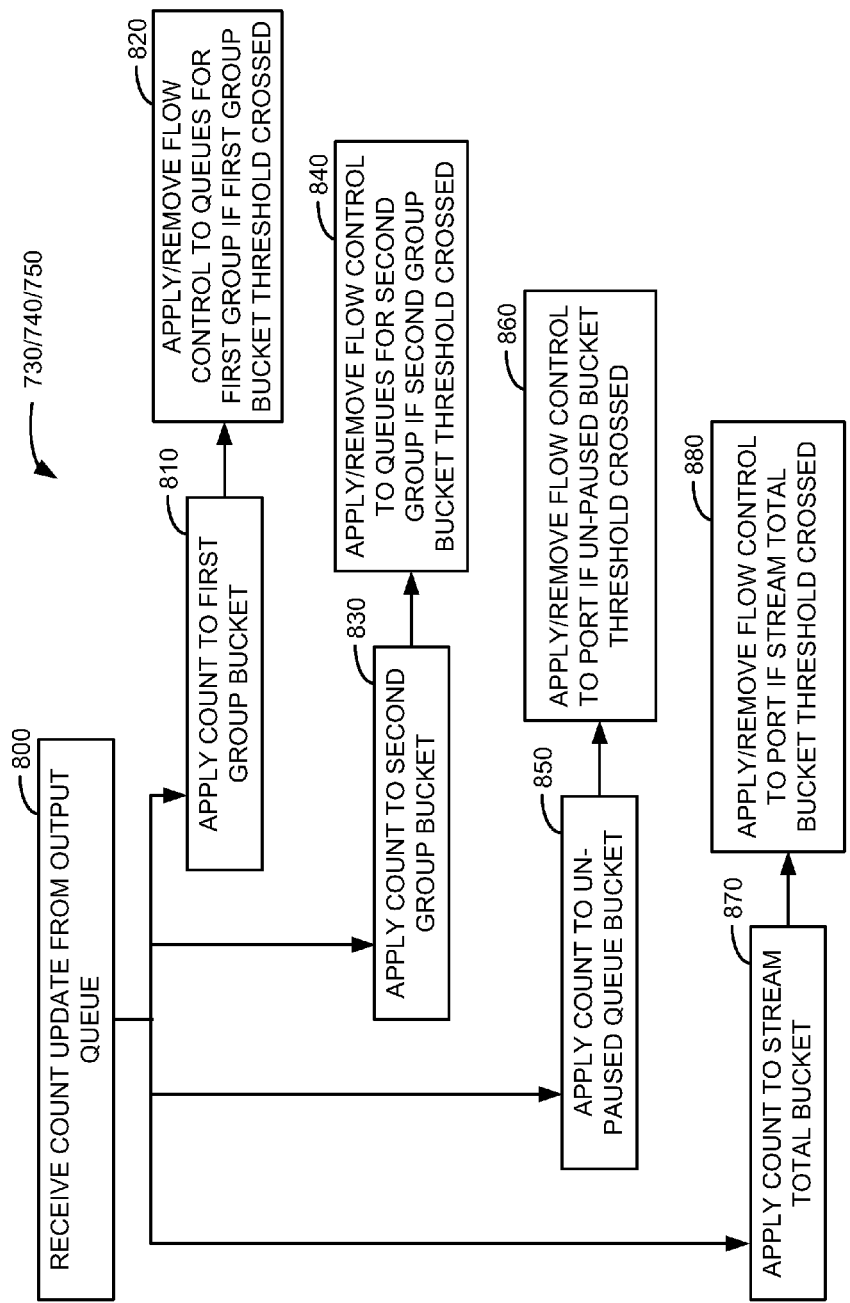

FIGS. 7 and 8 are flow charts of an example process 700 for managing transmit buffer resources according to an implementation described herein. In one implementation, process 700 may be performed by I/O controller 210. In another implementation, some or all of process 700 may be performed by another component or group of components, including or excluding I/O controller 210.

As shown in FIG. 7, process 700 may include receiving a packet at or transmitting a packet from a queue of a transmit buffer (block 710), applying the packet to a queue bucket count (block 720), updating second layer aggregate buckets (block 730), determining if one of the aggregate bucket thresholds has been crossed (block 740). For example, referring to components described in FIGS. 2-6 above, I/O controller 210 (e.g., scheduler 215) may receive a packet from queue scheduler 240. I/O controller 210 may process the packet at an egress packet processor, buffer the processed packet in one of output queues 400, and apply the packet count to one of queue buckets 510 that corresponds to the respective output queue 400 (e.g., queue 1, queue 2, queue 3 . . . , or queue M) of a particular stream (e.g., stream 420-1). Second layer 504 of queue bucket hierarchy 500 may include low priority group bucket 520, high priority group bucket 530, unrestricted queues bucket 540, and total stream bucket 550. The four aggregate buckets of second layer 504 may aggregate counts from queue buckets 510. Each of low priority group bucket 520, high priority group bucket 530, unrestricted queues bucket 540, and total stream bucket 550 may include packet counters and flow control thresholds that may trigger flow control signals to one or more queues of queue scheduler 240. For example, the added packet count in queue bucket 510 may raise the fill level in one or more of low priority group bucket 520, high priority group bucket 530, unrestricted queues bucket 540, and/or total stream bucket 550 to a threshold level, such as a high flow-control threshold (e.g., almost full threshold 610). Conversely, I/O controller 210 may dequeue a packet from one of output queues 400 and decrement the packet count for one of queue buckets 510 that corresponds to the respective dequeued output queue 400. The reduced packet count in queue bucket 510 may lower the fill level in one or more of low priority group bucket 520, high priority group bucket 530, unrestricted queues bucket 540, and/or total stream bucket 550 to a threshold level, such as a low flow-control threshold (e.g., almost empty threshold 620).

If one of the aggregate bucket thresholds is crossed (block 740—YES), process 700 may include applying or removing flow control to/from a corresponding queue (block 750). For example, referring to components described in FIGS. 2-6 above, if an added packet count in queue bucket 510 raises the fill level in high priority group bucket 530 above almost full threshold 610 for high priority group bucket 530, I/O controller 210 may send an invoke flow control signal (e.g. queue flow control 340) for the particular queue (or group of queues) of queue scheduler 240 that is associated with high priority group bucket 530. Conversely, if a reduced packet count in queue bucket 510 lowers the fill level below almost empty threshold 620 for high priority group bucket 530, I/O controller 210 may send a revoke flow control signal (e.g., queue flow control 340) for the particular queue of queue scheduler 240 that is associated with high priority group bucket 530.

If none of the aggregate bucket threshold are crossed (block 740—NO) or if flow controls are applied to a corresponding queue, process 700 may include applying the packet to an egress total bucket count (block 760), and determining if an egress bucket threshold has been crossed (block 770). For example, referring to components described in FIGS. 2-6 above, egress-side total bucket 560 may accumulate the total buffer utilization for all egress streams (e.g., streams 420-1, . . . , 420-N) in I/O unit 120. Egress-side total bucket 560 may include configurable flow control thresholds. I/O controller 210 may apply the packet count to egress-side total bucket 560. The added packet count in egress-side total bucket 560 may raise the fill level in egress-side total bucket 560 to a threshold level, such as a flow-control almost full threshold (e.g., almost full threshold 610). Conversely, I/O controller may dequeue a packet from one of output queues 400 and decrement the aggregate packet count for egress-side total bucket 560. The reduced packet count in egress-side total bucket 560 may lower the fill level in egress-side total bucket 560 to a threshold level, such as a flow-control almost empty threshold (e.g., almost empty threshold 620).

If the egress bucket threshold is crossed (block 770—YES), flow control may be applied to or removed from all streams (block 780). For example, referring to components described in FIGS. 2-6 above, if an added packet count in egress-side total bucket 560 raises the fill level in bucket 560 above the almost full threshold 610 for egress-side total bucket 560, I/O controller 210 may send an almost full flow control signal for all streams of queue scheduler 240 that are associated with egress-side total bucket 560. Conversely, if a reduced packet count in egress-side total bucket 560 lowers the fill level in bucket 560 below the almost empty threshold 620 for egress-side total bucket 560, I/O controller 210 may send an almost empty flow control signal for the streams of queue scheduler 240 that are associated with egress-side total bucket 560.

If the egress bucket threshold is not crossed (block 770—NO), or if flow controls are applied to or removed from all streams, process 700 may return to block 710 to receive/transmit another packet.

Process blocks 730-750 may include the process blocks depicted in FIG. 8. As shown in FIG. 8, process blocks 730-750 may include receiving a count update from an output queue (block 800). For example, referring to components described above in connection with FIG. 5, counts from each of queue buckets 510-1 through 510-M may be passed along to aggregate buckets in second layer 504 of hierarchy 500.

Process blocks 730-750 may include applying the count to a first group bucket (block 810), applying or removing flow control to queues for the first group if a first group bucket threshold is crossed (block 820); or applying the count to a second group bucket (block 830) and applying or removing flow control to queues for the second group if a second group bucket threshold is crossed (block 840). For example, referring to components described above in connection with FIGS. 5 and 6, low priority group bucket 520 and high priority group bucket 530 may be configured to represent an aggregation of classes within stream 420-1. A mapping function (e.g., map/mask 522 and map/mask 532) may associate each of buckets 510-1 through 510-M with one, both, or none of low priority group bucket 520 and high priority group bucket 530. Thus, while low priority group bucket 520 and high priority group bucket 530 may each receive a count update for every output queue bucket 510 associated with a particular stream 420, some count updates will be rejected based on the respective mapping functions. If an added packet count in low priority group bucket 520 and/or high priority group bucket 530 raises the fill level in the respective bucket above almost full threshold 610 for low priority group bucket 520 and/or high priority group bucket 530, I/O controller 210 may send a signal to invoke flow control for the group of queues in queue scheduler 240 that are associated with low priority group bucket 520 and/or high priority group bucket 530. Conversely, if a reduced packet count in low priority group bucket 520 and/or high priority group bucket 530 lowers the fill level in the respective bucket below almost empty threshold 620 for low priority group bucket 520 and/or high priority group bucket 530, I/O controller 210 may send an almost empty flow control signal for the group of queues in queue scheduler 240 that are associated with low priority group bucket 520 and/or high priority group bucket 530.

Process blocks 730-750 may also include applying the count to an unrestricted queue bucket (block 850) and applying or removing flow control to an associated stream if an unrestricted bucket threshold is crossed (block 860). For example, referring to components described above in connection with FIGS. 5 and 6, unrestricted queues bucket 540 may count the total occupancies for each of buckets 510 which are not subject to a per-priority pause for a particular stream. A mapping function (e.g., pause mask 542) may associate unpaused buckets 510 with unrestricted queues bucket 540. If an added packet count in unrestricted queues bucket 540 raises the fill level in the bucket above almost full threshold 610 for unrestricted queues bucket 540, I/O controller 210 may send an almost full flow control signal for the stream in queue scheduler 240 that is associated with unrestricted queues bucket 540. Conversely, if a reduced packet count in unrestricted queues bucket 540 lowers the fill level in the bucket below almost empty threshold 620 for unrestricted queues bucket 540, I/O controller 210 may send an almost empty flow control signal for the stream in queue scheduler 240 that is associated with unrestricted queues bucket 540.

Process blocks 730-750 may further include applying the count to a stream total bucket count (block 870) and applying or removing flow control to an associated stream if a stream total bucket threshold is crossed (block 880). For example, in implementations described above in connection with FIG. 5, total stream bucket 550 may count the total occupancies for the entire stream 420-1 (e.g., the sum for all of buckets 510-1 through 510-M in first layer 502). Total stream bucket 550 may include configurable flow-control thresholds that may be used to limit the total buffer usage for port 420-1. For example, when a fill level in total stream bucket 550 exceeds a flow-control threshold, a flow control signal may be sent to queue scheduler 240 for the respective stream. Use of the total stream bucket 550 may allow low priority group bucket 520 and high priority group bucket 530 to oversubscribe the allotted buffer space for port 420-1.

An implementation described herein may include systems and/or methods for implementing Priority-based Flow Control (PFC) in a manner that prevents head-of-line blocking of output queues. The systems and/or methods may allow one or more output queues to be restricted without incurring head-of-line blocking of the other output queues associated with a particular port. As more output queues are restricted, the restrictions may first spread to other queues within the same class group (without affecting the other class group). In extreme cases, flow controls may be asserted (e.g., to the upstream queue scheduler) for the entire port. In implementations herein, the buffer space allocated to each aggregate bucket may be fungible and may be oversubscribed.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations described herein may be implemented as a "component" that performs one or more functions. This component may include hardware, such as a processor, microprocessor, an application specific integrated circuit, or a field programmable gate array; or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a network device, a stream of packets for outputting on a particular port;
    assigning, by the network device, each packet in the stream of packets to one of multiple buffer queues associated with the particular port;
    generating, by the network device and based on the assigning, packet counts for the multiple buffer queues;
    aggregating, by the network device and to create a first priority aggregated count, a first set of packet counts of the packet counts,
        the first set of packet counts being for a first group of buffer queues, of the multiple buffer queues, that are associated with a first priority class;
    aggregating, by the network device and to create a second priority aggregated count, a second set of packet counts of the packet counts,
        the second set of packet counts being for a second group of buffer queues, of the multiple buffer queues, that are associated with a second priority class, and
        the first group of buffer queues being different from the second group of buffer queues;
    determining, by the network device, whether the first priority aggregated count exceeds a first flow-control threshold that is associated with the first group of buffer queues;
    determining, by the network device, whether the second priority aggregated count exceeds a second flow-control threshold that is associated with the second group of buffer queues; and
    sending, by the network device and to an upstream queue scheduler, one or more flow control signals when the first priority aggregated count exceeds the first flow-control threshold or when the second priority aggregated count exceeds the second flow-control threshold.

2. The method of claim 1, further comprising:
    aggregating, to create a port aggregated count, all of the packet counts for all of the multiple buffer queues;
    determining whether the port aggregated count exceeds a third flow-control threshold that is for all of the multiple buffer queues; and
    sending, to the upstream queue scheduler, another flow control signal when the port aggregated count exceeds the third flow-control threshold.

3. The method of claim 1, where the one or more flow control signals restrict delivery of packets to the first group of buffer queues and allow delivery of packets to the second group of buffer queues.

4. The method of claim 1, where the multiple buffer queues are included in an oversubscribed memory space.

5. The method of claim 1, further comprising:
    aggregating, to create an unrestricted aggregated count, two or more of the packet counts for a group of particular buffer queues of the multiple buffer queues,
        the group of particular buffer queues being not subject to a Priority Flow Control (PFC) restriction;
    determining whether the unrestricted aggregated count exceeds a third flow-control threshold associated with the group of particular buffer queues; and
    sending, to the upstream queue scheduler, another flow control signal when the unrestricted aggregated count exceeds the third flow-control threshold.

6. The method of claim 5, where the other flow control signal restricts the stream of packets from the upstream queue scheduler to the particular port.

7. The method of claim 5, where the unrestricted aggregated count indicates a quantity of packets eligible to be transmitted to the particular port from the group of particular buffer queues.

8. The method of claim 1, where the network device comprises one or more of:
a router,
a switch,
a gateway,
a firewall,
a network interface card (NIC),
a hub,
a bridge,
a proxy server, or
an optical add-drop multiplexer (OADM).

9. A network device comprising:
a memory including buffer space for multiple output queues associated with a particular port; and
a processor to:
receive a stream of packets for outputting on the particular port;
assign the stream of packets to the multiple output queues;
generate packet counts for the multiple output queues based on the assignment of the stream of packets;
aggregate a first set of packet counts, of the packet counts, to generate a first count for first output queues of the multiple output queues,
the first output queues being associated with a first priority class;
aggregate a second set of packet counts, of the packet counts, to generate a second count for second output queues of the multiple output queues,
the second output queues being associated with a second priority class, and
the first output queues being different from the second output queues;
determine whether the first count exceeds a first flow-control threshold;
determine whether the second count exceeds a second flow-control threshold; and
send, to an upstream queue scheduler, one or more flow control signals when the first count exceeds the first flow-control threshold or when the second count exceed the second flow-control threshold.

10. The network device of claim 9, where the processor is further to:
aggregate the packet counts for all of the multiple output queues to generate a third count;
determine whether the third count exceeds a third flow-control threshold for all of the multiple output queues; and
send, to the upstream queue scheduler, another flow control signal when the third count exceeds the third flow-control threshold.

11. The network device of claim 9, where the one or more flow control signals restrict delivery of packets to the first output queues and allow delivery of packets to the second output queues.

12. The network device of claim 9, where the multiple output queues are included in an oversubscribed memory space.

13. The network device of claim 10, where the other flow control signal restricts the stream of packets from the upstream queue scheduler to the port.

14. The network device of claim 9, where the processor is further to:
determine, based on two or more of the packet counts, a third count that indicates a quantity of packets that are eligible to be transmitted to the particular port from unrestricted output queues of the multiple output queues; and
send, to the upstream queue scheduler, another flow control signal based on the third count.

15. The network device of claim 9, where the network device comprises one or more of:
a router,
a switch,
a gateway,
a firewall,
a network interface card (NIC),
a hub,
a bridge,
a proxy server, or
an optical add-drop multiplexer (OADM).

16. A non-transitory computer readable medium storing instructions, the instructions comprising:
one or more instructions that, when executed by at least one processor, cause the at least one processor to:
receive a packet stream;
generate a plurality of packet counts for a plurality of queues by assigning packets in the packet stream to the plurality of queues;
determine a first count by aggregating a first set of packet counts, of the plurality of packet counts, for a first group of queues of the plurality,
the first group of queues being associated with a first priority class;
determine a second count by aggregating a second set of packet counts, of the plurality of packet counts, for a second group of queues of the plurality of queues,
the second group of queues being associated with a second priority class, and
the first group of queues being different from the second group of queues;
determine whether the first count exceeds a first flow-control threshold;
determine whether the second count exceeds a second flow-control threshold; and
send, to an upstream queue scheduler, one or more flow control signals when the first count exceeds the first flow-control threshold or when the second count exceeds the second flow-control threshold.

17. The non-transitory computer readable medium of claim 16, where the instructions further comprise:
one or more instructions that, when executed by the at least one processor, cause the at least one processor to:
determine a third count by aggregating a third set of packet counts, of the plurality of packet counts, for a third group of queues of the plurality of queues; queues including the particular queue;
determine, whether the third count exceeds a third flow-control threshold; and
send, to the upstream queue scheduler, another flow control signal when the third count exceeds the third flow-control threshold.

18. The non-transitory computer readable medium of claim 16, where the instructions further comprise:
one or more instructions that, when executed by the at least one processor, cause the at least one processor to:
determine, based on the plurality of counts, a total count that corresponds to all of the plurality of queues;
determine whether the total count exceeds a third flow-control threshold; and send, to the upstream queue scheduler, another flow control signal when the total count exceeds the third flow-control threshold.

19. The non-transitory computer readable medium of claim 16, where the plurality of queues are included within an oversubscribed memory space.

20. The non-transitory computer readable medium of claim 17, where the other flow control signal restricts the stream of packets from the upstream queue scheduler to a port associated with the packet stream.

* * * * *

UNITED STATES PATENT AND TRADEMARK OFFICE
CERTIFICATE OF CORRECTION

| | | |
|---|---|---|
| PATENT NO. | : 8,520,522 B1 | Page 1 of 1 |
| APPLICATION NO. | : 12/905696 | |
| DATED | : August 27, 2013 | |
| INVENTOR(S) | : Gary Goldman et al. | |

It is certified that error appears in the above-identified patent and that said Letters Patent is hereby corrected as shown below:

In the Claims

Please correct Claim 17 as follows:

Column 16, line 53-54, after "the plurality of queues" delete "; queues including the particular queue;".

Signed and Sealed this
Eleventh Day of August, 2015

Michelle K. Lee
*Director of the United States Patent and Trademark Office*